United States Patent
Yasuda (10) Patent No.: US 6,628,434 B1
(45) Date of Patent: Sep. 30, 2003

(54) METHOD AND SYSTEM FOR IMAGE TRANSFER AND IMAGE SIGNAL OUTPUT APPARATUS AND TERMINAL USED THEREFOR

(75) Inventor: Hiroaki Yasuda, Kaisei-machi (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 615 days.

(21) Appl. No.: 09/614,453

(22) Filed: Jul. 12, 2000

(30) Foreign Application Priority Data

Jul. 12, 1999  (JP) .......................................... 11-197109

(51) Int. Cl.$^7$ ................................................ H04N 1/04
(52) U.S. Cl. .................. 358/496; 358/480; 358/481; 358/487; 358/448; 358/445; 358/408; 250/581; 250/584; 382/294; 382/132
(58) Field of Search ................................ 358/480, 481, 358/496, 408, 448, 445, 487; 250/581, 584; 382/294, 132

(56) References Cited

U.S. PATENT DOCUMENTS

| | | | |
|---|---|---|---|
| 4,258,264 A | 3/1981 | Kotera et al. | 250/484 |
| 4,276,473 A | 6/1981 | Kato et al. | 250/327.1 |
| 4,315,318 A | 2/1982 | Kato et al. | 364/515 |
| 4,346,295 A | 8/1982 | Tanaka et al. | 250/327.2 |
| 4,387,428 A | 6/1983 | Ishida et al. | 364/414 |
| 4,485,302 A | 11/1984 | Tanaka et al. | 250/327.2 |
| 4,855,598 A | 8/1989 | Ohgoda et al. | 250/327.2 |
| 4,896,037 A | 1/1990 | Shimura et al. | 250/327.2 |
| 5,048,110 A | 9/1991 | Nakajima | 382/54 |
| 5,982,953 A | 11/1999 | Yanagita et al. | 382/294 |
| 6,016,356 A * | 1/2000 | Ito et al. | 382/132 |
| 6,239,448 B1 * | 5/2001 | Kawai | 250/586 |

FOREIGN PATENT DOCUMENTS

| | | | |
|---|---|---|---|
| JP | 56-11395 | 2/1981 | G21K/4/00 |
| JP | 7-3704 | 1/1995 | E01B/27/16 |

OTHER PUBLICATIONS

Abstract 07–003704 (JP 7003704A) Jan. 6, 1995.
Abstract JP 56011395A.

* cited by examiner

*Primary Examiner*—Mark Wallerson
*Assistant Examiner*—Heather D Gibbs
(74) *Attorney, Agent, or Firm*—Sughrue Mion, PLLC (57) ABSTRACT

Upon transferring two image signals to an output apparatus in an image transfer system, the amount of data to be transferred can be reduced. In an image signal output apparatus, subtraction signal generating means generates a subtraction signal from a front-side image signal and rear-side image signal, and the subtraction signal as well as either the front-side image signal or the rearside image signal are transferred to an operation and display terminal. When the front-side image signal and the subtraction signal are transferred, the operation and display terminal restores the rearside image signal by carrying out an operation using the subtraction signal and the front-side image signal having been transferred thereto. The front-side image signal and the rearside image signal are similar, and the amount of the subtraction signal is smaller than the amount of the rearside image signal, which results in reduction in the amount of data to be transferred.

22 Claims, 5 Drawing Sheets

METHOD AND SYSTEM FOR IMAGE TRANSFER AND IMAGE SIGNAL OUTPUT APPARATUS AND TERMINAL USED THEREFOR

BACKGROUND OF THE INVENTION

1. Field of the Invention

The present invention relates to an image transfer method and an image transfer system, and also to an image signal output apparatus and a terminal used therefor.

2. Description of the Related Art

In various fields such as medicine, images are conventionally displayed on an image display device such as a CRT display or output on a film by using a printer such as an LP (Laser Printer), after image data obtained by reading information of radiation images of subjects recorded on stimulable phosphor sheets or films are subjected to predetermined image processing.

Recently, digital image processing techniques using computers have been developed. Furthermore, various kinds of image generating apparatuses (image generating modalities) such as apparatuses for CT (Computed Tomography), MRI (Magnetic Resonance Imaging), and CR (Computed Radiography) using the digital image processing techniques have been spreading as apparatuses for generating diagnostic images and widely put into practice for diagnosing lesions and injuries, or for understanding the degrees thereof.

A CR apparatus is a radiation image recording and reading apparatus. In a CR apparatus, stimulable phosphor which stores partial energy of radiation irradiated thereon and emits light in accordance with the stored radiation energy when exposed to stimulating rays such as visible light or infrared rays is used. By using a stimulable phosphor sheet, radiation image information of a subject such as a human body is recorded thereon and an image signal is obtained by using photoelectric reading means such as a photomultiplier which photoelectrically reads the light emitted from the stimulable phosphor sheet by scanning the sheet with the stimulating rays. The CR apparatuses are in wide use and put into practice (for example, see Japanese Unexamined Patent Publication Nos. 55(1980)-12429, 56(1981)-11395, 55(1980)-163472, 56(1981)-104645 and 55(1980)-116340).

The assignee has proposed a method of photoelectrically reading the light from both sides of a stimulable phosphor sheet (for example, Japanese Unexamined Patent Publication Nos. 55(1980)-87970 and 8(1996)-116340). In this method, the photoelectric reading means described above are used on both sides of the stimulable phosphor sheet and the stimulating rays are irradiated on either one side or on both sides of the sheet in order to photoelectrically read the light emitted from both sides of the sheet.

In this double-sided light-collection reading method, a stimulable phosphor sheet is formed by disposing the stimulable phosphor on a surface of a transparent base material and the stimulable phosphor sheet storing a radiation image is placed on a transparent holder. The photoelectric reading means are located above and below the sheet. In other words, the photoelectric reading means placed above the holder reads light from the front side of the sheet while the photoelectric reading means placed below the holder reads light emitted from the backside of the sheet.

Image signals read from both sides (a front-side image signal and a rearside image signal) in the above manner are each subjected to filtering processing having different frequency characteristics. The signals are then added at corresponding pixels on both sides, and an addition image signal (superposition image signal) is obtained. According to this addition image signal, high frequency noise occurring randomly in each of the signals is smoothed by the addition. Moreover, since the light is collected from both sides of the sheet, light collection efficiency is improved and a superposition image displayed based on the superposition image signal has an improved S/N ratio, which leads to an image that is easier to see.

Furthermore, as a method of obtaining radiation image information by using the stimulable phosphor sheet described above, a method of obtaining a radiation image having a specific subject portion emphasized or extracted has been known. In this method, a plurality of image signals are obtained by reading a plurality of radiation images photographed and recorded in different conditions, and an image corresponding to a subtraction of these images, that is, the radiation image having a specific portion emphasized or extracted is obtained by finding a subtraction image signal based on a subtraction operation on these images. As this subtraction processing (operation), time subtraction processing and energy subtraction processing disclosed in Japanese Unexamined Patent Publication Nos. 7(1995)-3704 and 8(1996)-76741 are basically known, and the assignee has also proposed time subtraction processing using a stimulable phosphor sheet described in Japanese Unexamined Patent Publication No. 60(1985)-206392 and energy subtraction processing using a stimulable phosphor sheet described in Japanese Unexamined Patent Publication Nos. 59(1984)-83486 and 60(1985)-225541, for example.

Meanwhile, due to the spread and progress of networking technologies following the recent development of technologies in communications and computers, diagnostic medical image networks have been installed as image transfer systems in the field of medicine, for example. In such a network, various kinds of image generating apparatuses installed in a medical examination room or the like of a hospital are connected to an image display apparatus or an image output apparatus such as a printer installed in a consulting room or a laboratory, and diagnostic image information obtained by the image generating apparatuses in the examination room can be obtained even in the consulting room.

In such an image transfer system using the network or the like, in the case where an image after an operation such as the addition operation or the subtraction operation described above is output from an image output apparatus, an addition image signal or a subtraction image signal after the operation is conventionally transferred from the image generating apparatus to the image output apparatus, and the image output apparatus outputs the image based on the transferred image signal.

However, in this method, it is difficult for the output image to be output again after being subjected to a further addition or subtraction operation using a different parameter, following confirmation of the output image.

In order to solve this problem, a method of outputting an image based on an image signal after an operation is possible. In this method, a plurality of image signals obtained by an image generating apparatus, that is, original image signals are transferred as they are from the image generating apparatus to an image output apparatus, and the image output apparatus carries out the addition operation or the subtraction operation described above using a predetermined parameter on the original image signals having been transferred. An image is then output based on the image signal after the operation. Alternatively, another method of image display is also possible. In this method, the original image signals are transferred together with an addition image signal or a subtraction image signal after an operation, and an image is normally displayed based on the addition image signal or the subtraction image signal. In the case where parameter change is necessary, an image is displayed based on a signal after the operation using the original image signals.

However, if a plurality of image signals for one image are transferred, the amount of data transfer increases and transfer time becomes longer or a large-capacity storing device for storing the large amount of data becomes necessary.

The present invention has been conceived based on the above considerations. An object of the present invention is therefore to provide an image transfer method and an image transfer system enabling reduction in the amount of data and an image signal output apparatus and a terminal used therefor, in the case where a plurality of image signals are transferred so that an image output apparatus can output an image after carrying out an addition operation or a subtraction operation while changing an operation parameter.

SUMMARY OF THE INVENTION

An image transfer method of the present invention pays attention to a characteristic that a plurality of original image signals obtained by a radiation image information reading apparatus described above have different frequency characteristics and noise characteristics but have substantially similar values and the amount of data of a subtraction signal is less than the amount of the original image data.

In other words, a first image transfer method of the present invention is a method of transferring an image in an image transfer system comprising an image signal output apparatus for outputting an image signal representing a radiation image, a terminal for receiving the image signal transferred thereto, and transfer means for transferring the image signal output from the image signal output apparatus to the terminal. The image transfer to method comprises the steps of:

finding a subtraction signal between two image signals representing the radiation image;

transferring the subtraction signal together with either one of the two image signals from the image signal output apparatus to the terminal; and restoring the image signal not having been transferred by using the subtraction signal and the image signal having been transferred. "Restoring the signal not having been transferred" refers to the following cases. Let one of the two image signals be A and the other B. If the image signal after an operation is an addition image signal C (C=A'+B') and if the signal A and a subtraction signal D (D=A−B) are transferred, the signal B is restored by an operation A−D=A−(A−B)=B. Here, A' and B' refer to image signals after filtering processing having different frequency characteristics on the signals A and B respectively. Alternatively, in the case where the signal B and the subtraction signal D are transferred, the signal A is restored by an operation B+D=B+(A−B)=A.

A second image transfer method of the present invention is a method used in an image transfer system comprising an image signal output apparatus for outputting an image signal representing a radiation image, a terminal for receiving the image signal transferred thereto, and transfer means for transferring the image signal output from the image signal output apparatus to the terminal. The image transfer method comprises the steps of:

carrying out filtering processing having different frequency characteristics on two image signals representing the radiation image;

finding a processed image signal by carrying out an operation using two image signals after the filtering processing;

finding subtraction signals between the processed image signal and each of the two image signals;

transferring the two subtraction signals and the processed image signal from the image signal output apparatus to the terminal; and restoring the two radiation image signals not having been transferred, by using the two subtraction signals and the processed image signal having been transferred. "Finding subtraction signals between the processed image signal and each of the two image signals" refers to finding a subtraction signal E by carrying out an operation A−C=E and finding a subtraction signal F by carrying out an operation B−C=F, with A, B meaning the two radiation image signals and C meaning an addition image signal as the processed image signal, as in the above example in the first method. Furthermore, "restoring the two radiation image signals not having been transferred" refers to restoration of the signal A by carrying out an operation C+E=C+(A−C)=A and restoration of the signal B by carrying out an operation C+F=C+(B−C)=B. "Transferring" refers to transmitting at least two image signals from the image signal output apparatus to the terminal, and any method can be used for the transfer. For example, not only the transfer using the network described above but also a transfer via a medium such as a CD-R or an MO may be used. In this case, image data (image signals) are stored by using the image signal output apparatus as the medium, and the terminal reads the image data from the medium.

In the first image transfer method and in the second image transfer method of the present invention, it is preferable for the two image signals representing the radiation image to be two image signals representing images obtained by simultaneous photographing of one subject.

As the images obtained by simultaneous photographing, a radiation image represented by two image signals one of which represents a front-side image obtained by detecting light emitted from the front side of an image recording medium using stimulable phosphor and storing the radiation image and the other of which represents a rearside image obtained by detecting light emitted from the rear side of the image recording medium may be used, for example.

In this case, either the front-side image or the rearside image is a first image used in the superposition processing and the other is a second image used therein.

Alternatively, either the front-side image or the rearside image can be a low voltage image used in energy subtraction processing and the other can be a high voltage image used therein.

The front side and the rear side described above do not refer to specific surfaces of an image recording medium, and if one of the surfaces of an image recording medium is called the front side, the surface on the opposite side is called the rear side. Normally, the surface on the side being scanned by the stimulating rays is often called the front side.

In the first and second image transfer methods of the present invention, the two image signals representing a radiation image can be two image signals representing images obtained by photographing one subject at different times.

In this case, it is preferable for the two image signals representing the radiation image to represent images after positioning processing on the images obtained by photographing one subject at different times.

Furthermore, one of the image signals after positioning processing can be a present image used in time subtraction processing and the other can be a past image used therein.

The present and the past in the above explanation represent the order of photographing and do not refer to any specific time. In other words, between the images photographed at different times, the present image refers to an image photographed later (at a time closer to the present) than the other image, and the past image is an image photographed earlier (at a time going more backward to the past) than the present image.

A first image transfer system of the present invention is a system for realizing the first image transfer method of the present invention. In other words, the first image transfer system comprises an image signal output apparatus for outputting an image signal representing a radiation image, a terminal for receiving the image signal transferred thereto, and transfer means for transferring the image signal output from the image signal output apparatus to the terminal. In the system, the image signal output apparatus comprises subtraction signal generating means for generating a subtraction signal from two image signals representing the radiation image, and outputs the subtraction signal and either one of the two image signals, and the terminal comprises restoration means for restoring the other image signal not having been transferred, by using the subtraction signal and the image signal having been transferred thereto.

A second image transfer system of the present invention is a system for realizing the second image transfer method described above. In other words, the second image transfer system comprises an image signal output apparatus for outputting an image signal representing a radiation image, a terminal for receiving the image signal transferred thereto, and transfer means for transferring the image signal output from the image signal output apparatus to the terminal. In this system, the image signal output apparatus comprises signal processing means for carrying out filtering processing having different frequency characteristics on two image signals representing the radiation image, processed image signal generating means for generating a processed image signal obtained by using two image signals after the filtering processing, and subtraction signal generating means for generating subtraction signals between the processed image signal and each of the two image signals representing the radiation image, and the image signal output apparatus outputs the two subtraction signals and the processed image signal. Meanwhile, the terminal comprises restoration means for restoring the two radiation image signals not having been transferred, by using the two subtraction signals and the processed image signal having been transferred thereto.

In the image transfer systems of the present invention, it is preferable for the two image signals representing the radiation image to be two image signals representing images obtained by simultaneous photographing of one subject.

As the images obtained by simultaneous photographing, a radiation image represented by two image signals one of which represents a front-side image obtained by detecting light emitted from the front side of an image recording medium using stimulable phosphor and storing the radiation image and the other of which represents a rearside image obtained by detecting light emitted from the rear side of the image recording medium may be used, for example.

In this case, either the front-side image or the rearside image is a first image used in superposition processing and the other is a second image used therein.

Alternatively, either the front-side image or the rearside image can be a low voltage image used in energy subtraction processing and the other can be a high voltage image used therein.

In the image transfer systems of the present invention, the two image signals representing a radiation image can be two image signals representing images obtained by photographing one subject at different times.

In this case, it is preferable for the two image signals representing the radiation image to represent images after positioning processing on the images obtained by photographing one subject at different times.

Furthermore, one of the images after positioning processing may be a present image used in time subtraction processing while the other may a past image used therein.

A first image signal output apparatus of the present invention is an apparatus used in the first image transfer method and the system described above. The first image signal output apparatus comprises a subtraction signal generating means for generating a subtraction signal from two image signals representing a radiation image, and the first image signal output apparatus outputs the subtraction signal and either one of the image signals.

A second image signal output apparatus of the present invention is an apparatus used in the second image transfer method and system described above. The second image signal output apparatus comprises signal processing means for carrying out filtering processing having different frequency characteristics on two image signals representing a radiation image, processed image signal generating means for generating a processed image signal obtained by using two image signals after the filtering processing, and subtraction signal generating means for generating subtraction signals between the processed image signal and each of the two image signals, and the second image signal output apparatus outputs the two subtraction signals and the processed image signal.

A first terminal of the present invention is a terminal used in the first image transfer method and system described above. The first terminal comprises restoration means for restoring an image signal not having been transferred thereto, by using a subtraction signal of two image signals representing a radiation image and by using either one of the two image signals.

A second terminal of the present invention is a terminal used in the second image transfer method and system described above. The second terminal comprises restoration means for restoring two image signals representing a radiation image and not having been transferred thereto, by using a processed image signal obtained by an operation using two image signals after filtering processing having different frequency characteristics on the two image signals and by using two subtraction signals representing subtractions between each of the two image signals and the processed image signal.

In the image signal output apparatuses and terminals of the present invention, as in the image transfer methods and systems described above, it is also preferable for the two image signals representing the radiation image to represent images obtained by simultaneous photographing of one subject, such as a front-side image and a rearside image. In this case, the images can be used as first and second images for superposition processing or as a low voltage image and a high voltage image for energy subtraction processing.

Alternatively, as in the image transfer methods and systems described above, the two image signals representing the radiation image may represent images obtained by photographing one subject at different times. In this case, it is preferable for the two image signals to represent images after positioning processing, and the two images can be used as a present image and a past image used in time subtraction processing.

In the first image transfer method and system of the present invention, the image signal output apparatus generates the subtraction signal between the two image signals that are similar to each other, and the image signal output apparatus outputs the subtraction signal having been generated and either one of the image signals to the terminal. The amount of data of the subtraction signal is at least smaller than the amount of data of either a front-side image signal or a rearside image signal. Therefore, the amount of total data to be transferred is smaller in the present invention than in the case of simply transferring any two of the front-side image signal, the rearside image signal, and the processed image signal.

Meanwhile, in the second image transfer method and system of the present invention, the image signal output apparatus transfers to the terminal the processed image signal obtained by using the two image signals after the filtering processing having different frequency characteristics on the two image signals that are similar to each other and the two subtraction signals representing subtractions between each of the two image signals and the processed image signal. Therefore, the amount of total data to be transferred becomes smaller, as in the first image transfer method and system.

Therefore, according to the image transfer methods and systems of the present invention, upon transferring images obtained by simultaneous photographing of one subject, such as the first and second images used in the superposition processing or the low and high voltage images used in the energy subtraction processing, or upon transferring images obtained by photographing one subject at different times, such as the present and past images used in the time subtraction processing, transfer time for one image can be shortened, and fast transfer can be realized. At the same time, the capacity of a storing device for storing data can be smaller. In other words, the number of images which can be stored can be increased.

Furthermore, according to the first image transfer method and system of the present invention, the terminal restores the image signal not having been transferred thereto, by using the subtraction signal and the image signal having been transferred. Therefore, the processed image signal can be generated by using the restored image signal, and an image after changing a parameter for addition or subtraction operation can also be output.

Moreover, according to the second image transfer method and system of the present invention, the terminal restores the two image signals not having been transferred thereto, by using the processed image signal and the two subtraction signals. Therefore, as in the first image transfer method and system, the processed image signal can be generated by using the restored image signals, and an image after changing a parameter for the addition or subtraction operation can also be output.

DESCRIPTION OF THE PREFERRED EMBODIMENTS

Hereinafter, embodiments of the present invention will be explained in detail with reference to the accompanying drawings.

Figure 1:
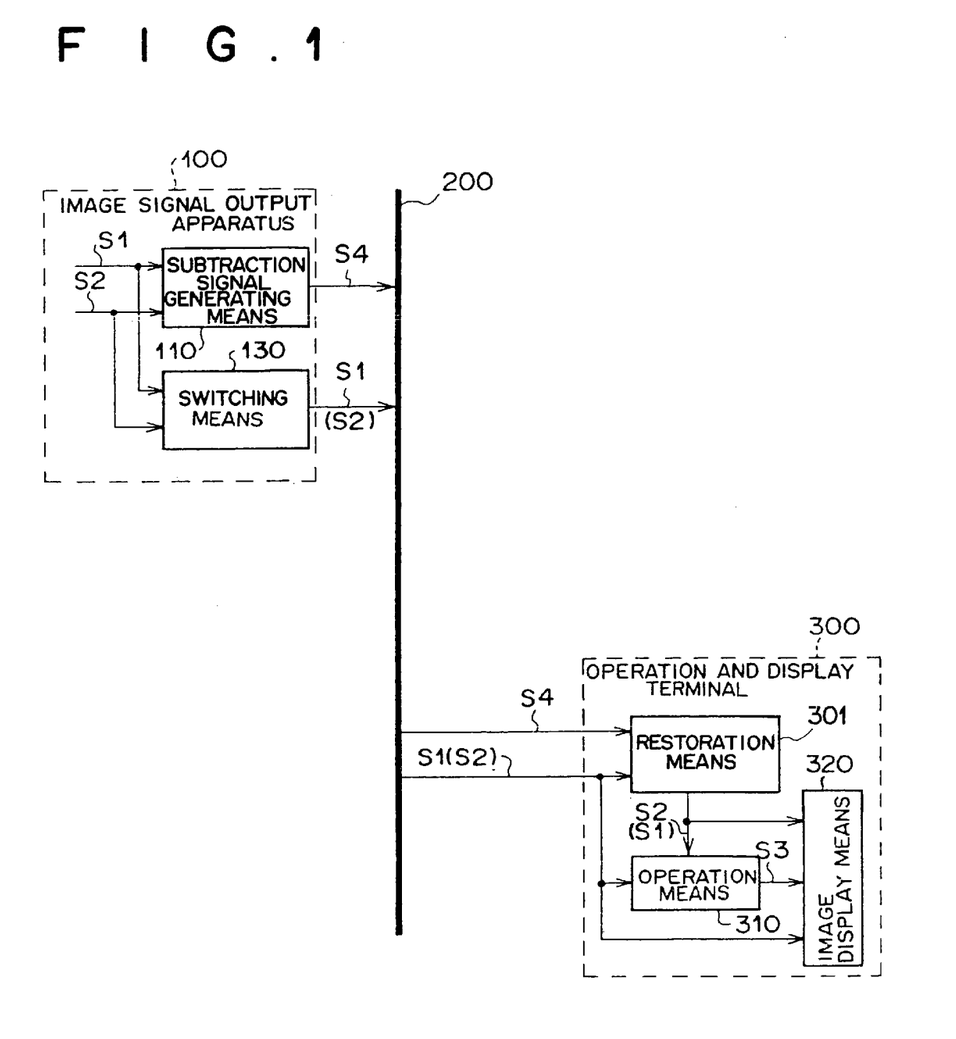
FIG. 1 is a block diagram showing a configuration of an image transfer system realizing a first image transfer method of the present invention.

FIG. 1 is a block diagram showing a configuration of an image transfer system realizing a first image transfer method of the present invention. As shown in FIG. 1, the image transfer system comprises an image signal output apparatus 100 having subtraction signal generating means 110 and output switching means 130, a network 200 as transfer means, and an operation and display terminal 300 having restoration means 301, operation means 310, and image display means 320. The image transfer system can be used as a medical network system in a hospital, for example.

As the image signal output apparatus 100, any apparatus which has the subtraction signal generating means 110 for generating a subtraction signal based on a plurality of image signals and outputs the subtraction signal and either one of the image signals used for generating the subtraction signal can be used. For example, an image generating apparatus such as a CT apparatus or a CR apparatus can be used as a part of the image signal output apparatus for obtaining a plurality of image signals.

Figure 2:
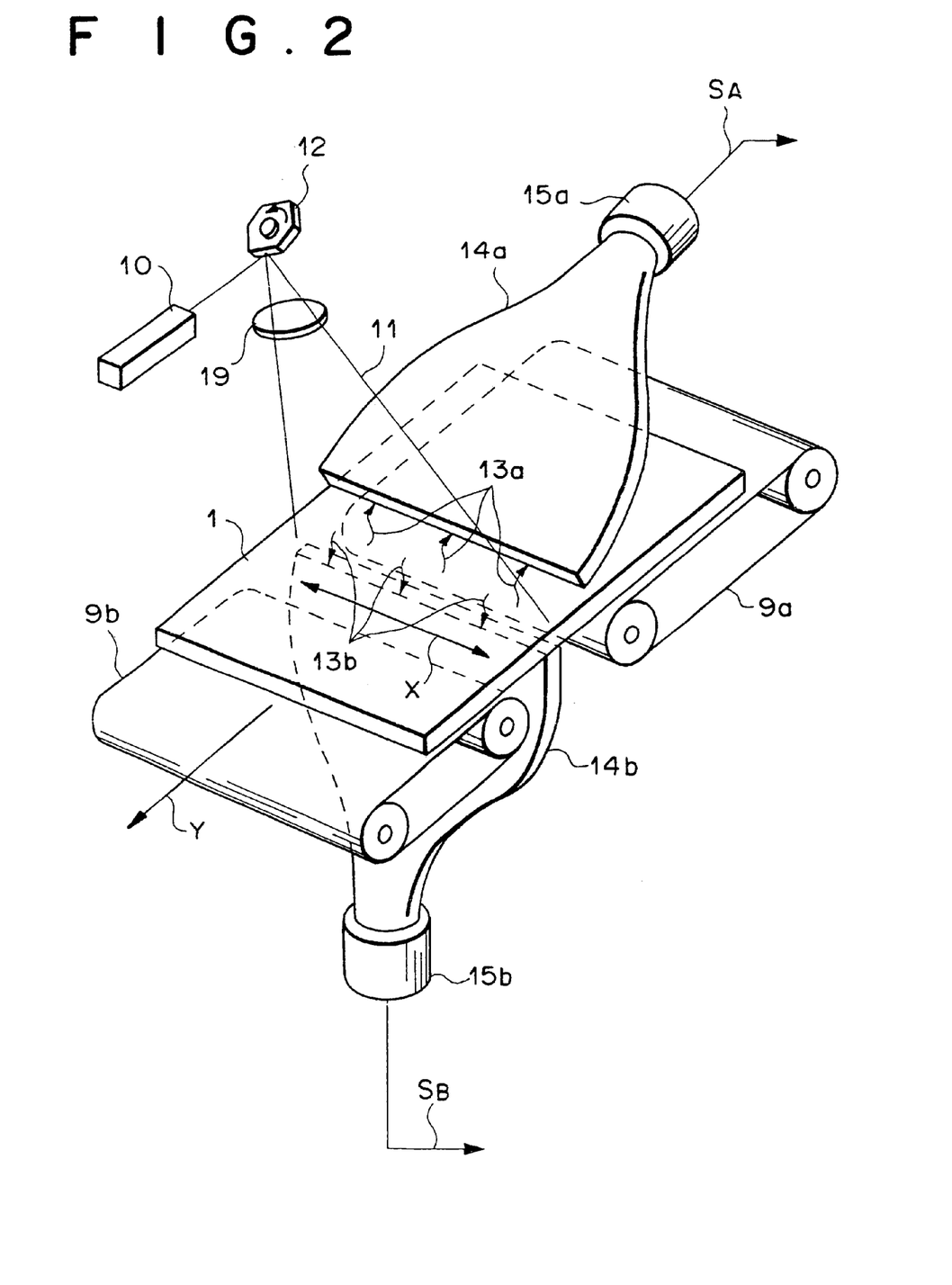
FIG. 2 is an illustration showing an outline configuration of a radiation image information reading apparatus of two-sided light collection type as an image signal output apparatus comprising the image transfer system.

FIG. 2 is an illustration showing an outline configuration of a radiation image information reading apparatus of two-sided light collection type used as the part for obtaining the image signals in the image signal output apparatus 100.

As shown in FIG. 2, in this radiation image information reading apparatus, a stimulable phosphor sheet 1 is placed on endless belts 9a and 9b which are rolled by a motor not shown. A laser beam source 10 for emitting a beam 11 as a stimulating ray, a rotating polygon 12 rotated by a motor not shown for reflecting the beam 11 to main-scan the sheet 1, and a scanning lens 19 for focusing the reflected beam 11 on the sheet 1 and for moving the beam 11 at an even speed are located above the sheet 1. A light collecting guide 14a for collecting light emitted from the sheet by the scan with the beam 11 from the above is located above a position where the beam 11 scans. A light guide 14b is located below the position and orthogonal to the sheet 1 for collecting the light from below. The light guides 14a and 14b are connected to photomultipliers (photomultiplier tubes) 15a and 15b respectively, for photoelectrically detecting the light. The photomultipliers 15a and 15b are connected to logarithmic amplifiers which are not shown.

Upon obtaining a radiation image signal by using this radiation image information reading apparatus, the stimulable phosphor sheet 1 storing a radiation image of a subject is set on the endless belts 9a and 9b. The stimulable phosphor sheet 1 set at the predetermined position is conveyed (vertical-scanned) in a direction shown by an arrow Y by the endless belts 9a and 9b. Meanwhile, the beam 11 emitted from the laser beam source 10 is reflected by the rotating polygon 12 driven by the motor not shown and rotating rapidly in a direction shown by an arrow. The beam then enters the sheet 1 and main-scans the sheet 1 in a direction shown by an arrow X almost orthogonal to the vertical scan direction (the direction Y). Light 13a and light 13b each in accordance with radiation image information stored on the sheet is emitted from the above and below the sheet 1 respectively, at a position on the sheet 1 where the beam 11 is irradiated.

The light 13a from the upper side of the sheet 1 enters an incidence surface of the light collecting guide 14a and propagates inside the guide 14a while repeating total reflection. The light 13a is then emitted from an emergence surface of the guide 14 and received by the photomultiplier 15a to be converted into an analog electric signal $S_A$ in accordance with the amount of the light 13a representing the radiation image. Likewise, the light 13b emitted from the lower side of the sheet 1 is guided by the light collecting guide 14b and photoelectrically detected by the photomultiplier 15b to be converted into an analog electric signal $S_B$. In this manner, two image signals representing the radiation image are obtained.

The electric signals $S_A$ and $S_B$ respectively output from the photomultipliers 15a and 15b are input to the logarithmic amplifiers not shown, and further input to image processing means not shown. The electric signal $S_A$ is finally converted into an image signal S1 while the electric signal $S_B$ is converted into an image signal S2. Hereinafter, the image signal S1 based on the light emitted from the upper side of the sheet 1, that is the light emitted from the side on which the beam 11 is irradiated is called a front-side image signal S1, and the image signal S2 based on the light emitted from the lower side of the sheet 1 is called a rearside image signal S2. An image represented by the front-side image signal S1 is called a front-side image and an image represented by the image signal S2 is called a rearside image. The front-side image and the rearside image are images obtained by simultaneous photographing of one subject.

In a conventional image transfer system, the front-side image signal S1 representing the front-side image and the rearside image signal S2 representing the rearside image are subjected to respective filtering processing having different frequency characteristics, and an addition image signal as a processed image signal is obtained by an addition operation using the image signals after the filtering processing. The addition image signal alone is then output to the network 200. However, in this case, an image obtained by changing an addition operation parameter after confirmation of the output image is difficult to be output again. In order to solve this problem, it is possible to collectively transfer the front-side image signal S1 and the rearside image signal S2. However, if the two image signals S1 and S2 for one image are transferred, the amount of the data to be transferred becomes almost double the amount of data in a conventional method. Therefore, time for transfer becomes longer and a large-capacity storing device for storing the large amount of data becomes necessary, which is problematic.

Meanwhile, the image transfer system of the present invention in the above configuration transfers a plurality of image signals while reducing the amount of data to be transferred. The front-side image signal S1 and the rearside image signal S2 obtained by the radiation image information reading apparatus of two-sided light collection type have similar values although the two signals have different characteristics in frequency and noise, for example. Therefore, an addition image signal S3 obtained by adding the front-side image signal S1 and the rearside image signal S2 has values similar to the front-side image signal S1 and the rearside image signal S2. A subtraction signal S4 which is a subtraction between the two image signals has substantially a small amount of data and the number of bits necessary can thus be reduced. Therefore, the image transfer system of the present invention pays attention to this fact and the amount of total data to be transferred is reduced by transferring the subtraction signal S4 and either one of the image signals S1 or S2, compared with the case of simply transferring any two of the front-side image signal S1, the rearside image signal S2, and the addition image signal S3. Hereinafter, this operation will be explained in detail.

In the image signal output apparatus 100, the subtraction signal generating means 110 generates the subtraction signal S4 by carrying out an operation S1−S2=S4 using the front-side image signal S1 and the rear side imagesignal S2. Either the front-side image signal S1 or the rearside image signal S2 as well as the generated subtraction signal S4 are output to the network 200. The output switching means 130 selects and outputs the front-side image signal S1 from the two image signals S1 and S2 input thereto, for example. Consequently, the image signal output apparatus 100 outputs the subtraction signal S4 and the front-side image signal S1.

The front-side image signal S1 and the subtraction signal S4 are transferred to the operation and display terminal 300 via the network 200. An operation parameter for an addition operation may be transferred, being attached to the image signals S1 and S4.

In the operation and display terminal 300 having been received the front-side image signal S1 and the subtraction signal S4, the restoration means 301 carries out an operation S1−S4=S1−(S1−S2)=S2 to restore the rearside image signal S2 not having been transferred thereto, using the front-side image signal S1 and the subtraction signal S4. In parallel to this restoration processing, a front-side image is preferably displayed by the image display means 320, based on the front-side image signal S1. At this time, it is preferable for a predetermined mark to be displayed so as to indicate that the image being displayed is not a superposition image after an addition operation.

Figure 3:
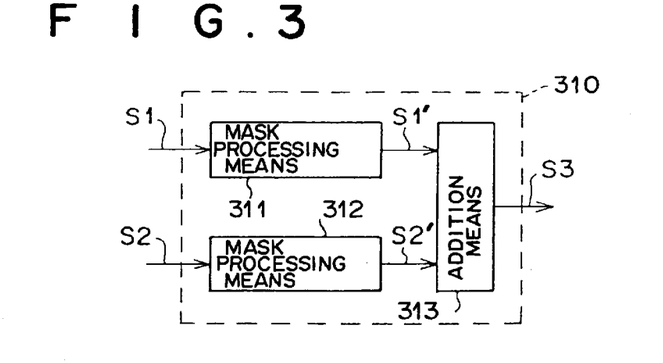
FIG. 3 is a diagram showing in detail operation means of an operation and display terminal comprising the image transfer system.

The operation means 310 carries out filtering processing having different frequency characteristics on the front-side image signal S1 and on the rearside image signal S2 having been restored. The operation means 310 then generates the addition image signal S3 representing the superposition image by carrying out the addition operation on the two image signals after the filtering processing.

The operation means 310 comprises mask operation means 311 for carrying out a mask operation as the filtering processing on the front-side image signal S1, mask operation means 312 for carrying out a mask operation on the rearside image signal S2, and addition means 313 as processed image signal generating means for generating the addition image signal S3 representing the superposition image, by carrying out an addition operation S1'+S2'=S3 using a front-side image signal S1' after the mask operation and a rearside image signal S2' after the mask operation. As the mask operation, any known method can be used. Furthermore, upon the addition operation, an operation $\alpha \times S1' + \beta \times S2' = S3$ using multiplication by predetermined coefficients may be carried out.

As the filtering processing using the mask operation, any known method can be used. For example, as disclosed in Japanese Unexamined Patent Publication No. 7(1995)-319092, processing for finding a coefficient signal in each frequency band by carrying out wavelet transform on an image signal may be used. In the case where the method disclosed in Japanese Unexamined Patent Publication No. 7(1995)-319092 is used, the addition means 313 carries out the addition processing by using weights optimal for each frequency band for both the front side and the rear side, as has been described therein.

After the addition image signal S3 has been generated by the operation means 310, the image display means 320 switches from the front-side image to the superposition image and displays the superposition image. Alternatively, the front-side image and the superposition image are displayed together on the left and right of a screen, respectively.

Upon the mask operation by the operation means 310, any parameter can be used. As a result, the image display means 320 can output the superposition image after a parameter change.

In the above explanation, the front-side image signal S1 as well as the subtraction image signal S4 have been transferred from the image signal output apparatus 100 to the operation and display terminal 300. However, it is needless to say that the rearside image signal S2 may be transferred instead of the front-side image signal S1.

Figure 4:
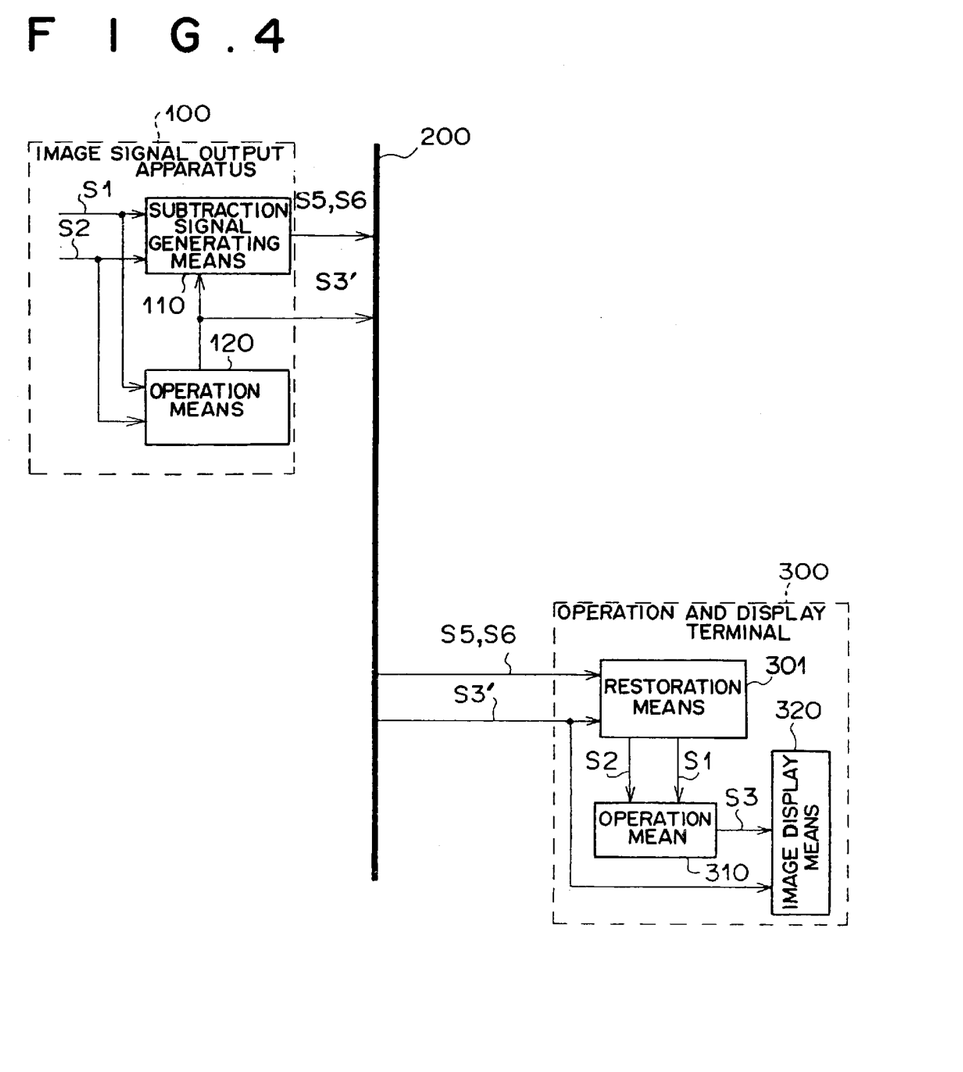
FIG. 4 is a block diagram showing a configuration of an image transfer system realizing a second image transfer method of the present invention.

A configuration of an image transfer system realizing a second image transfer method of the present invention is shown as a block diagram in FIG. 4. As shown in FIG. 4, the image transfer system comprises an image signal output apparatus 100 having subtraction signal generating means 110 and operation means 120, a network 200 as transfer means, and an operation and display terminal 300 having restoration means 301, operation means 310 and image display means 320.

In this image transfer system, the operation means 120 in the image signal output apparatus 100 carries out filtering processing having different frequency characteristics on a front-side image signal S1 and on a rearside image signal S2, and generates an addition image signal S3' representing a superposition image by carrying out an addition operation using two image signals S1' and S2' after the filtering processing. As the operation means 120, the same operation means as the operation means 310 can be used.

The subtraction signal generating means 110 generates a subtraction signal S5 and a subtraction signal S6 by carrying out an operation S1−S3'=S5 and an operation S2−S3'=S6 respectively, using the addition image signal S3' the front-side image signal S1, and the rearside image signal S2. The generated subtraction signals S5 and S6 and the addition image signal S3' are transferred to the network 200, and then transferred to the operation and display terminal 300 via the network 200.

In the operation and display terminal 300 having been received the two subtraction signals S5 and S6 and the addition image signal S3' having been transferred thereto, the image display means 320 displays a superposition image based on the addition image signal S3' having been transferred. In parallel to this display, the restoration means 301 restores the front-side image signal S1 and the rearside image signal S2 not having been transferred thereto, by carrying out an operation S3'+S5=S3'+(S1−S3')=S1 and an operation S3'+S6=S3'+(S2−S3')=S2, respectively, using the subtraction signals S5 and S6 and the addition image signal S3'.

The operation means 310 carries out filtering processing having different frequency characteristics on the front-side image signal S1 and on the rearside image signal S2 having been restored, and an addition image signal S3 representing a superposition image is generated by carrying out an addition operation using the two image signals S1' and S2' after the filtering processing.

Upon the mask operation in the operation means 310, by using a parameter different from a parameter used in the operation means 120 in the image signal output apparatus 100, the addition image signal S3 using the different parameter can be obtained. Therefore, in the case where the parameter for the addition operation needs to be changed, the superposition image after the parameter change can be output if the image display means 320 switches from the addition image signal S3' to the addition image signal S3 and displays the addition image signal S3.

As has been described above, according to the image transfer methods and systems as well as the image signal output apparatuses and the operation and display terminals of the present invention, the subtraction signal between the front-side image signal S1 and the rearside image signal S2, or the addition image signal and the two subtraction signals representing subtractions between the addition image signal and the two image signals are transferred collectively. Therefore, the amount of data to be transferred can be reduced compared to the case of simply transferring any two of the front-side image signal S1, the rearside image signal S2 and the addition image signal S3. As a result, transfer time for one image can be shortened and transfer can be made faster. Furthermore, the capacity of a storing device for storing data can be made smaller. In other words, the number of images which can be stored can be increased. Moreover, an image resulted from an operation changing a parameter for the addition operation may be displayed, which improves convenience.

In the above explanation, the radiation image information reading apparatus of two-sided light collection type has been used as the image signal output apparatus 100 for obtaining the images by carrying out simultaneous photographing on one subject, and the operation means 310 has generated the addition image signal S3. However, the present invention is not limited to this embodiment.

For example, an apparatus for obtaining a high voltage image signal representing a high voltage image and a low voltage image signal representing a low voltage image for energy subtraction processing may be used as the image signal output apparatus and the operation means may generate an image signal representing an energy subtraction image. Hereinafter, this aspect will be explained.

Figure 5:
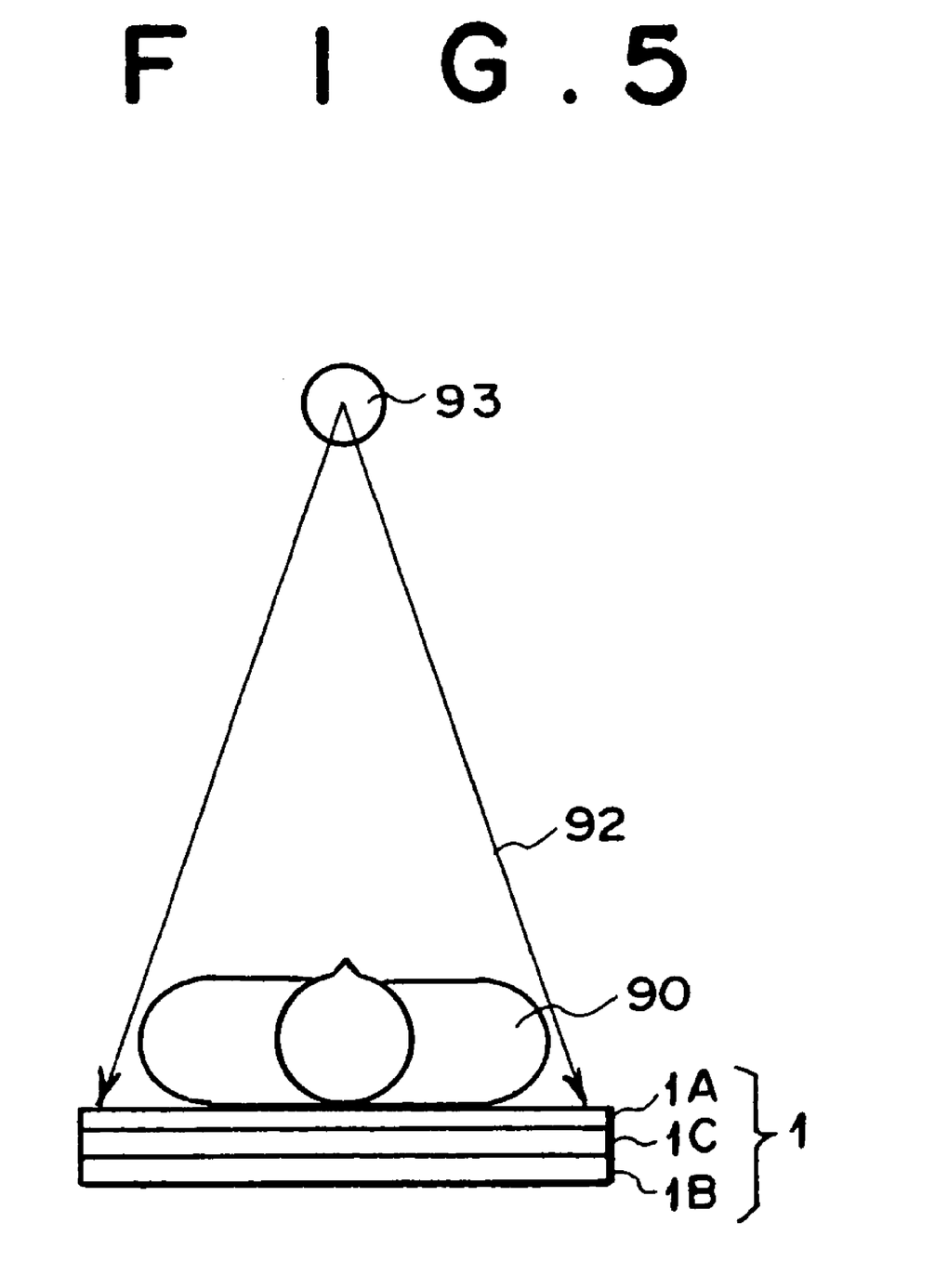
FIG. 5 is an illustration showing recording of a low voltage image and a high voltage image for energy subtraction processing on two stimulable phosphor sheets.

FIG. 5 is an illustration showing recording of images obtained by simultaneous photographing of a subject 90 on two stimulable phosphor sheets 1A and 1B as the low voltage image and the high voltage image for the energy subtraction processing. As a sheet 1, a stimulable phosphor sheet for energy subtraction processing comprising layers of the two stimulable phosphor sheets 1A and 1B and an energy absorption material 1C is used. In FIG. 5, the stimulable phosphor sheet layer 1A using stimulable phosphor for efficiently absorbing X rays having a comparatively low energy level is located on the side closer to the subject 90, while the stimulable phosphor sheet layer 1B using stimulable phosphor for efficiently absorbing X rays having a comparatively high energy level is located on the side farther from to the subject 90. The energy absorption material layer 1C is sandwiched between the two phosphor sheet layers 1A and 1B. In this case, the low voltage image is recorded on the sheet 1A and the high voltage image is recorded on the sheet 1B.

X-ray images are respectively read from the two sheets 1A and 1B, and image signals S1 and S2 are obtained. A reading apparatus used for the reading may be a single-sided reading apparatus excluding the light collecting guide 14b and the photomultiplier 15b from the reading apparatus of two-sided light collection type shown in FIG. 2. An image signal output from a photomultiplier 15a upon reading the sheet 1A is defined as the image signal S1 and an image signal output from the photomultiplier 15a upon reading the sheet 1B is defined as the image signal S2. Therefore, regardless of the reading order of the sheets 1A and 1B, the image signal S1 represents the low voltage image and the image signal S2 represents the high voltage image.

The image signal S1 representing the low voltage image and the image signal S2 representing the high voltage image have substantially similar values although they have different X-ray energy information. Therefore, the amount of a subtraction signal S4 obtained by subtraction processing on the two image signals is substantially small as in the above embodiments, and the number of necessary bits can be reduced. In this case the subtraction signal generating means 110 functions as operation means for carrying out the subtraction processing.

Therefore, as in the above embodiments, the amount of total data to be transferred can be reduced by transferring the subtraction signal S4 and either the image signal S1 representing the low voltage image or the image signal S2 representing the high voltage image, compared to the case of collectively transferring the image signal S1 and the image signal S2.

The present invention is applicable not only to the case of transferring the images obtained by simultaneous photographing of one subject but also to the case of transferring images obtained by photographing one subject at different times.

For example, an apparatus enabling acquisition of a past image signal representing a past image and a present image signal representing a present image for time subtraction processing can be used as the image signal output apparatus while the operation means can generate a subtraction signal representing a time subtraction image. Hereinafter, this aspect will be explained.

Figure 6:
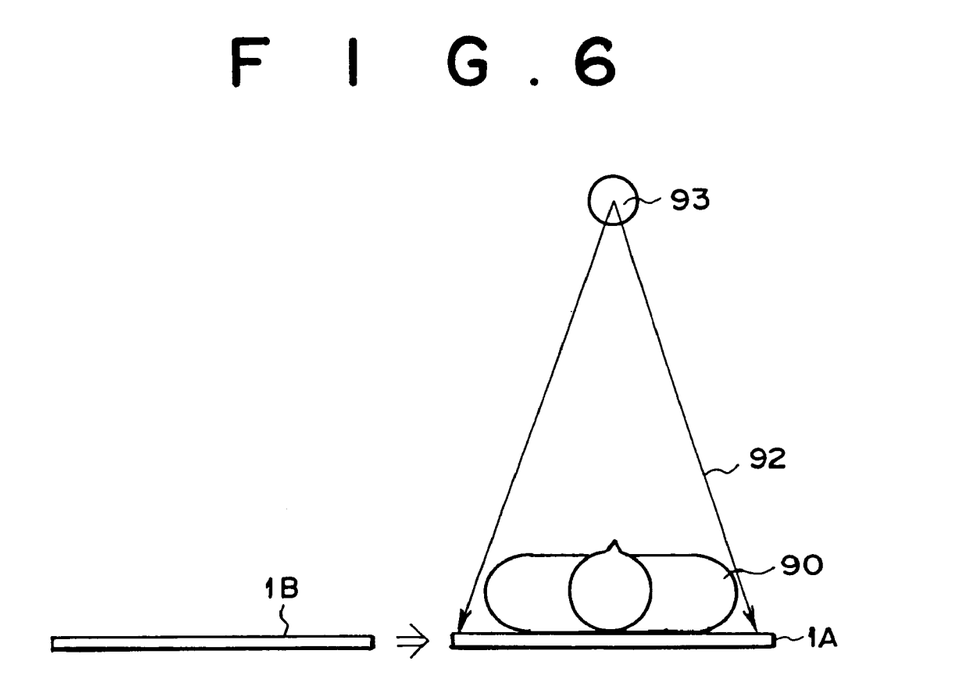
FIG. 6 is an illustration showing recording of a present image and a past image for time subtraction processing on two stimulable phosphor sheets.

FIG. 6 is an illustration showing recording of an X-ray 92 passed through a subject 90 on two stimulable phosphor sheets 1 in a condition of injecting a substance for creating an image into a specific structure of the subject 90 and in a condition of no injection or injection of the substance into another structure thereof. As a sheet 1, two sheets 1A and 1B having the same characteristic are used. A tube voltage of a light source 93 is the same in each condition and relative positions of the subject 90 and the sheets 1A and 1B are also the same. In this manner, two X-ray images having no difference except for injection of the image-creating substance are recorded on the sheets 1A and 1B. In this case, one of the X-ray images is recorded on the sheet 1A first and the other is recorded on the sheet 1B after exchanging the sheets. The past image older in terms of time is recorded on the sheet 1A and the present image newer in terms of time is recorded on the sheet 1B.

The X-ray images are respectively read from the two sheets 1A and 1B and image signals S1 and S2 are obtained. The reading apparatus used upon this reading can be a single-sided reading apparatus, as in the case of the energy subtraction processing. An image signal output from a photomultiplier 15a upon reading the sheet 1A is defined as the image signal S1 and an image signal output from the photomultiplier 15a upon reading the sheet 1B is defined as the image signal S2. Therefore, regardless of the reading order of the sheets 1A and 1B, the image signal S1 represents the past image and the image signal S2 represents the present image.

The image signal S1 representing the past image and the image signal S2 representing the present image have substantially similar values although they have different states of injection of the image-creating substance. Therefore, an image signal S4 indicating a subtraction between the two image signals obtained by subtraction processing has a substantially small amount of data as in the energy subtraction processing. As a result, the number of necessary bits can be reduced.

Consequently, as in the case of the energy subtraction processing, the amount of total data to be transferred can be reduced by transferring the subtraction signal S4 and either the image signal S1 representing the past image or the image signal S2 representing the present image, compared to the case of collectively transferring the image signal S1 and the image signal S2.

The images used in the time subtraction processing tend to have a position difference between the images, since a body motion such as a heartbeat and a tilt of the subject cannot be avoided. Therefore, an output image (a subtraction image) tends to have an artifact. In order to reduce the artifact due to the position difference, positioning processing using any known position correction method such as a method disclosed in Japanese Unexamined Patent Publication Nos. 7(1995)-3704 and 8(1996)-76741 is carried out on the two images and the past image and the present image after the positioning processing are used.

In addition, all of the contents of the Japanese Patent Application No. 11(1999)-197109 are incorporated into this specification by reference.

What is claimed is:

1. A method of transferring an image in an image transfer system comprising an imagesignal output apparatus for outputting an image signal representing a radiation image, a terminal for receiving the image signal transferred thereto, and transfer means for transferring the image signal output from the image signal output apparatus to the terminal, the image transfer method comprising the steps of:

finding a subtraction signal between two image signals representing the radiation image;

transferring the subtraction signal together with either one of the two image signals from the image signal out put apparatus to the terminal; and restoring the image signal not having been transferred by using the subtraction signal and the image signal having been transferred.

2. A method of transferring an image in an image transfer system comprising an image signal output apparatus for outputting an image signal representing a radiation image, a terminal for receiving the image signal transferred thereto, and transfer means for transferring the image signal output from the image signal output apparatus to the terminal, the image transfer method comprising the steps of:

carrying out filtering processing having different frequency characteristics on two image signals representing the radiation image;

finding a processed image signal by carrying out an operation using two image signals after the filtering processing;

finding subtraction signals between the processed image signal and each of the two image signals representing the radiation image;

transferring the two subtraction signals and the processed image signal from the image signal output apparatus to the terminal; and restoring the two radiation image signals not having been transferred, by using the two subtraction signals and the processed image signal having been transferred.

3. An image transfer method as claimed in claim 1 or 2 wherein the two image signals representing the radiation image are two image signals representing images obtained by simultaneous photographing of one subject.

4. An image transfer method as claimed in claim 3 wherein one of the two image signals representing the radiation image represents a front-side image obtained by detecting light emitted from a front surface of an image recording medium using stimulable phosphor and storing the radiation image and the other of the two image signals represents a rearside image obtained by detecting light emitted from a rear surface of the image recording medium.

5. An image transfer method as claimed in claim 4 wherein either the front-side image or the rearside image is a first image used in superposition processing and the other is a second image used in the superposition processing.

6. An image transfer method as claimed in claim 4 wherein either the front-side image or the rearside image is a low voltage image used in energy subtraction processing and the other is a high voltage image used in the energy subtraction processing.

7. An image transfer method as claimed in claim 1 or 2 wherein the two image signals representing the radiation image are two image signals representing images obtained by photographing one subject at different times.

8. An image transfer method as claimed in claim 7 wherein the two image signals representing the radiation image are two image signals representing images after positioning processing obtained by photographing of the one subject at different times.

9. An image transfer method as claimed in claim 8 wherein one of the images after positioning processing is a present image used in time subtraction processing and the other is a past image used in the time subtraction processing.

10. An image transfer system comprising an image signal output apparatus for outputting an image signal representing a radiation image, a terminal for receiving the image signal transferred thereto, and transfer means for transferring the image signal output from the image signal output apparatus to the terminal, the image signal output apparatus comprising subtraction signal generating means for generating a subtraction signal from two image signals representing the radiation image, and outputting the subtraction signal and either one of the two image signals; and the terminal comprising restoration means for restoring the other image signal not having been transferred, by using the subtraction signal and the image signal having been transferred thereto.

11. An image transfer system comprising:

an image signal output apparatus for outputting an image signal representing a radiation image, a terminal for receiving the image signal transferred thereto, and transfer means for transferring the image signal output from the image signal output apparatus to the terminal, the image signal output apparatus comprising signal processing means for carrying out filtering processing having different frequency characteristics on two image signals representing the radiation image, processed image signal generating means for generating a processed image signal obtained by using two image signals after the filtering processing, and subtraction signal generating means for generating subtraction signals between the processed image signal and each of the two image signals representing the radiation image, the image signal output apparatus outputting the two subtraction signals and the processed image signal; and the terminal comprising restoration means for restoring the two radiation image signals not having been transferred, by using the two subtraction signals and the processed image signal having been transferred thereto.

12. An image transfer system as claimed in claim 10 or 11 wherein the two image signals representing the radiation image are two image signals representing images obtained by simultaneous photographing of one subject.

13. An image transfer system as claimed in claim 12 wherein one of the two image signals representing the radiation image represents a front-side image obtained by detecting light emitted from a front surface of an image recording medium using stimulable phosphor and storing the radiation image and the other of the two image signals represents a rearside image obtained by detecting light emitted from a rear surface of the image recording medium.

14. An image transfer system as claimed in claim 13 wherein either the front-side image or the rearside image is a first image used in superposition processing and the other is a second image used in the superposition processing.

15. An image transfer system as claimed in claim 13 wherein either the front-side image or the rearside image is a low voltage image used in energy subtraction processing and the other is a high voltage image used in the energy subtraction processing.

16. An image transfer system as claimed in claim 10 or 11 wherein the two image signals representing the radiation image are two image signals representing images obtained by photographing one subject at different times.

17. An image transfer system as claimed in claim 16 wherein the two image signals representing the radiation image are two image signals representing images after positioning processing obtained by photographing the one subject at different times.

18. An image transfer system as claimed in claim 17 wherein one of the images after positioning processing is a present image used in time subtraction processing and the other is a past image used in the time subtraction processing.

19. An image signal output apparatus for an image transfer system, the image signal output apparatus comprising subtraction signal generating means for generating a subtraction signal from two image signals representing a radiation image, and outputting the subtraction signal and either one of the image signals.

20. An image signal output apparatus for an image transfer system, the image signal output apparatus comprising signal processing means for carrying out filtering processing having different frequency characteristics on two image signals representing a radiation image, processed image signal generating means for generating a processed image signal obtained by using two image signals after the filtering processing, and subtraction signal generating means for generating subtraction signals between the processed image signal and each of the two image signals representing the radiation image, and the image signal output apparatus outputting the two subtraction signals and the processed image signal.

21. A terminal for an image transfer system, the terminal comprising restoration means for restoring an image signal not having been transferred thereto, by using a subtraction signal of two image signals representing a radiation image and by using either one of the two image signals.

22. A terminal for an image transfer system, the terminal comprising restoration means for restoring two image signals representing a radiation image and not having been transferred thereto, by using a processed image signal obtained by an operation using two image signals after filtering processing having different frequency characteristics on the two image signals representing the radiation image and by using two subtraction signals representing subtractions between each of the two image signals representing the radiation image and the processed image signal.

* * * * *